United States Patent
Holley

(10) Patent No.: US 8,817,331 B2
(45) Date of Patent: Aug. 26, 2014

(54) TRANSCODING RUN LENGTH LIMITED DATASTREAMS FOR OBJECT LEVEL HALFTONING

(75) Inventor: Michael J. Holley, Broomfield, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 1194 days.

(21) Appl. No.: 12/703,933

(22) Filed: Feb. 11, 2010

(65) Prior Publication Data

US 2011/0194126 A1 Aug. 11, 2011

(51) Int. Cl.
*H04N 1/405* (2006.01)
(52) U.S. Cl.
USPC .......................................... 358/3.06; 358/3.01
(58) Field of Classification Search
USPC ................................ 358/3.01–3.32
See application file for complete search history.

(56) References Cited

U.S. PATENT DOCUMENTS

| | | | |
|---|---|---|---|
| 6,317,222 B1 * | 11/2001 | Eldridge et al. | 358/2.1 |
| 6,657,561 B1 | 12/2003 | Hanna | |
| 7,130,072 B2 | 10/2006 | Suzuki | |
| 7,362,475 B2 | 4/2008 | Toda | |
| 7,468,803 B2 | 12/2008 | Aoyagi et al. | |
| 2002/0136306 A1 * | 9/2002 | Frojdh et al. | 375/240.23 |
| 2005/0105125 A1 | 5/2005 | Park et al. | |
| 2005/0110788 A1 | 5/2005 | Turner et al. | |

* cited by examiner

*Primary Examiner* — Benny Q Tieu
*Assistant Examiner* — Michael Y Tzeng
(74) *Attorney, Agent, or Firm* — Duft Bornsen & Fettig LLP

(57) ABSTRACT

Methods and systems for transcoding continuous tone Run Length Limited (RLL) encoded datastreams for including information for identifying halftone screens within the datastream are disclosed. Sequential packets comprising headers and bitmap data are identified within the datastream. Halftone screens associated with bitmap data within the packets are identified and merged into the packets to generate a modified RLL output.

15 Claims, 8 Drawing Sheets

TRANSCODING RUN LENGTH LIMITED DATASTREAMS FOR OBJECT LEVEL HALFTONING

BACKGROUND

1. Field of the Invention

The invention is related to the field of transcoding systems and, in particular, to transcoding of Run Length Limited (RLL) encoded datastreams.

2. Statement of the Problem

Print data transmitted between various processes within a printing system is typically encoded to reduce the amount of bandwidth utilized to transmit the print data and/or the data storage requirements for storing the data. Before the encoded print data is printed, the print data is decoded and screened using a "halftone" process before being sent to a print engine. Halftoning is a reprographic technique that simulates a continuous tone image with dots, where the dots may vary either in size and/or in spacing. Where continuous tone images may contain an infinite range of colors or grays, a halftone image typically generated by a printing system is a binary image comprising a limited set of colors such as black, Cyan, Magenta, Yellow, and Key black (CMYK), or Red Green Blue (RGB). This type of binary reproduction relies on the optical illusion that tiny dots can generate smooth image tones when viewed by the human eye, thus appearing to be a continuous tone image to the viewer.

Halftoning uses a high frequency/low frequency dichotomy to generate a continuous tone illusion from a halftone image. In halftoning, the low frequency component is a local area of the output image designated as a halftone cell. Each halftone cell relates to a corresponding area (size and location) of the continuous tone input image. Within each halftone cell, the high frequency component is a variable-sized halftone dot composed of ink or toner. The ratio of the inked area to the non-inked area within the halftone cell represents the luminosity of the corresponding area on the continuous tone input image. From a distance, the human eye averages both the high frequency component corresponding to the ink ratio within the halftone cell and the low frequency component corresponding to the size of the halftone cell.

In digital halftoning, a raster image processor generates a raster image, or bitmap, which comprises a 2-dimensional array of pixels. Each pixel may be either on or off, ink or no ink. In order to simulate the halftone cell, the digital halftone cell contains groups of monochrome (e.g., black) or limited color pixels (e.g., CMYK) within the same sized halftone area. The location and sizes of the monochrome or limited color pixels within the digital halftone cell represent the high frequency/low frequency dichotomy of the halftone method described above.

In a typical digital printing system, Page Description Language (PDL) data, such as PostScript data, PDF (Portable Document Format) data, Intelligent Printer Data Stream (IPDS) data, Advanced Function Presentation (AFP) data, Mixed Object: Document Content Architecture (MODCA) data, or other types of PDL data is rasterized and converted into bitmap data (i.e., a 2-dimensional array of pixels). Monochrome data may be represented by a single 2-dimensional array of pixels, while color data may be represented by multiple 2-dimensional arrays of pixels, one for each color. The bitmap data may then be encoded to reduce the amount of data used to represent the bitmap while transmitting the bitmap data through various post rasterizing processes within the printing system. After rasterizing and encoding, the bitmap data is decoded and halftoned using a halftone screen before being sent to a print engine for printing. The halftone screen, when applied to the bitmap data, defines the characteristics of the halftone cells used to represent the final output image.

One type of data encoding used by printing systems to reduce the amount of data used to represent the bitmap data is Run Length Limited (RLL) encoding. RLL encoding is a lossless compression scheme, which bounds the length of runs of repeat data during which the signal does not change. Apple Computer, Inc. introduced an RLL encoding scheme with the release of the Macintosh® computer called PackBits. A PackBits datastream includes packets with a one-byte header followed by one or more bytes of data. The header is a signed byte and defines the following data bytes as either literal data or repeat data. The header also defines the number of bytes of encoded literal data or encoded repeat data. In other words, the header encodes both the type of data (literal or repeat) and the amount of encoded data (the number of data bytes subsequent to the header).

One problem with associating halftone screen information with data within an RLL datastream, such as PackBits, is that the data is encapsulated in the RLL format, which renders associations difficult without first decoding the datastream. However, such decoding merely for associating the data with halftone screen information may entail significant hardware processing resources, which may not be available.

SUMMARY OF THE INVENTION

Embodiments herein describe transcoding of continuous tone Run Length Limited (RLL) encoded datastreams for including information for identifying halftone screens associated with bitmap data. Sequential RLL packets comprising headers and bitmap data are identified from the datastream. Halftone screens associated with the bitmap data are identified and information identifying the halftone screens are merged within the RLL packets to generate a modified RLL output. The modified RLL output may subsequently be processed to decode the blocks of bitmap data and the merged information for identifying the halftone screens, and provided to a halftoning system for generating a halftone output. Transcoding the RLL datastream provides for a reduction in the bandwidth and/or the data storage requirement by including the information within the RLL datastream.

One embodiment comprises a transcoding system, which may be implemented within a printing system. The transcoding system includes an identification system and an insertion system. The identification system is operable to identify packets within an RLL encoded datastream, where the RLL datastream comprises continuous tone data, and where the packets comprise headers and blocks of bitmap data defined by the headers. The identification system is further operable to identify halftone screens for halftoning the blocks of bitmap data. The insertion system is operable to merge information for identifying the halftone screens within the packets to generate a modified RLL output.

Another embodiment comprises a decoding system, which may be implemented within the printing system. The decoding system includes an identification system and an RLL processor. The identification system is operable to identify blocks of bitmap data and halftone screens from the modified output. The RLL processor is operable to decode the blocks of bitmap data based on an RLL encoding defined by an associated header, and to provide the decoded blocks of bitmap data and the information for identifying the halftone screens to a halftoning system operable to generate a halftone output.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
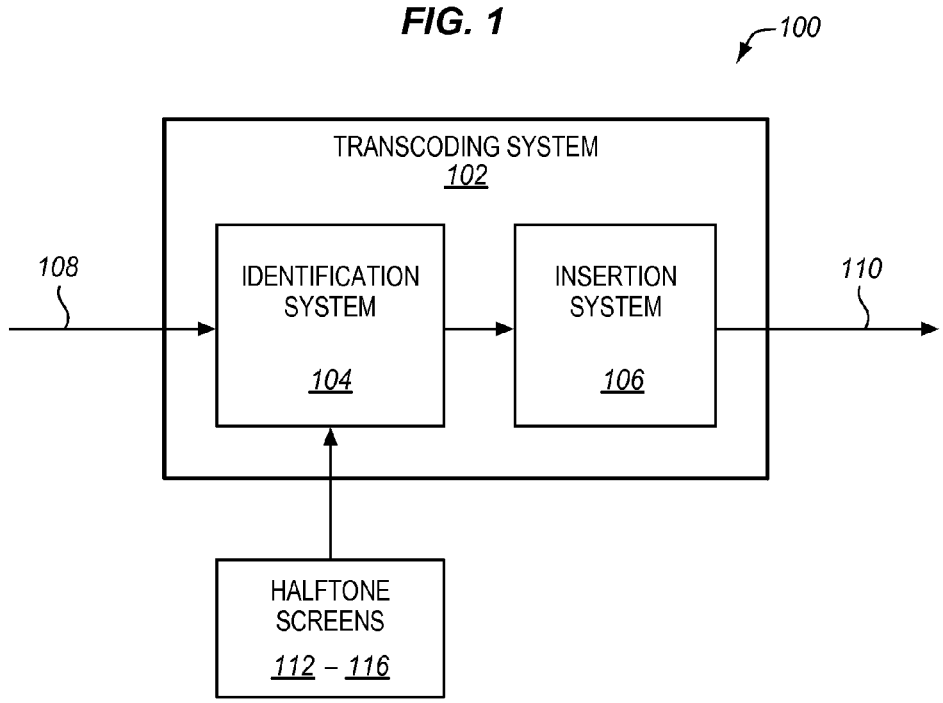
FIG. 1 illustrates a system including a transcoding system in an exemplary embodiment.

FIG. 1 illustrates a system 100 including a transcoding system 102 in an exemplary embodiment. Transcoding system 102 may for example be included within a printing system for transcoding RLL encoded print datastreams. Transcoding system 102 receives an RLL encoded datastream and transcodes the datastream to include information for identifying the halftone screens associated with blocks of bitmap data within the datastream. By transcoding the datastream to include the information for identifying the halftone screens without first decoding the datastream, a reduction in the computational resources utilized may be realized. The inclusion of the information within the datastream also provides for a reduction in the bandwidth and/or the data storage requirement.

Transcoding system 102 includes an identification system 104 and an insertion system 106. Identification system 104 comprises any device, component, or system operable to identify packets of RLL encoded data, where the packets include headers and blocks of bitmap data defined by the headers. Identification system 104 additionally comprises any device, component, or system operable to identify halftone screens 112-116 for halftoning the blocks of bitmap data. Insertion system 106 comprises any device, component, or system operable to merge the information for identifying halftone screens 112-116 within the packets of RLL data to generate a modified RLL output 110.

Figure 2:
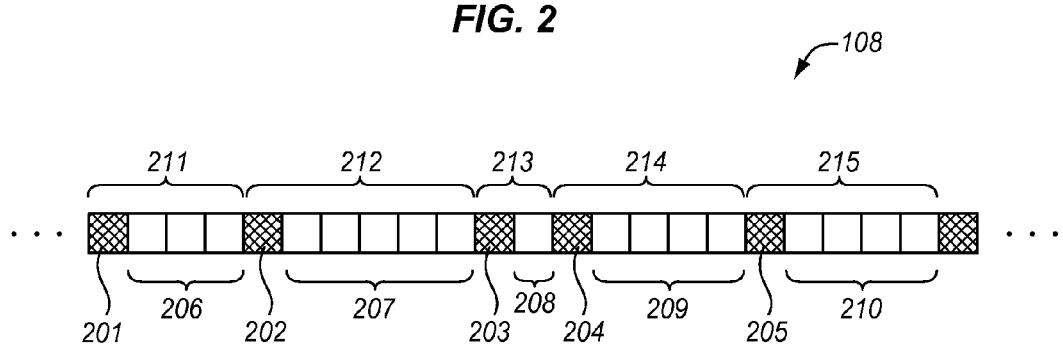
FIG. 2 illustrates a Run Length Limited (RLL) encoded datastream.

FIG. 2 illustrates an RLL encoded datastream 108. Datastream 108 includes headers 201-205 and data blocks 206-210 within packets 211-215, each of which may include one or more bits or bytes of data, such as bitmap data. In datastream 108, headers 201-205 define respective data blocks 206-210 within a corresponding packet. For example, header 201 defines data block 206 within packet 211 and header 202 defines data block 207 within packet 212. In like manner, header 203 defines data block 208 within packet 213, header 204 defines data block 209 within packet 214, and header 205 defines data block 210 within packet 215. Headers 201-205 each define a type of RLL encoding and a number of encoded elements of respective data blocks 206-210. In datastream 108, halftone screens 112-116 are each associated with one of respective data blocks 206-210. For example, halftone screen 112 is associated with data block 206. In like manner, halftone screen 113 is associated with data block 207, halftone screen 114 is associated with data block 208, halftone screen 115 is associated with data block 209, and halftone screen 116 is associated with data block 210. Although datastream 108 illustrates a specific configuration of headers 201-205, data blocks 206-210, and associated halftone screens, one skilled in the art will recognize that datastream 108 may comprise various combinations of headers, data blocks, and associated halftone screens. Thus, datastream 108 is not limited to the specific configuration illustrated in FIG. 2.

Figure 3:
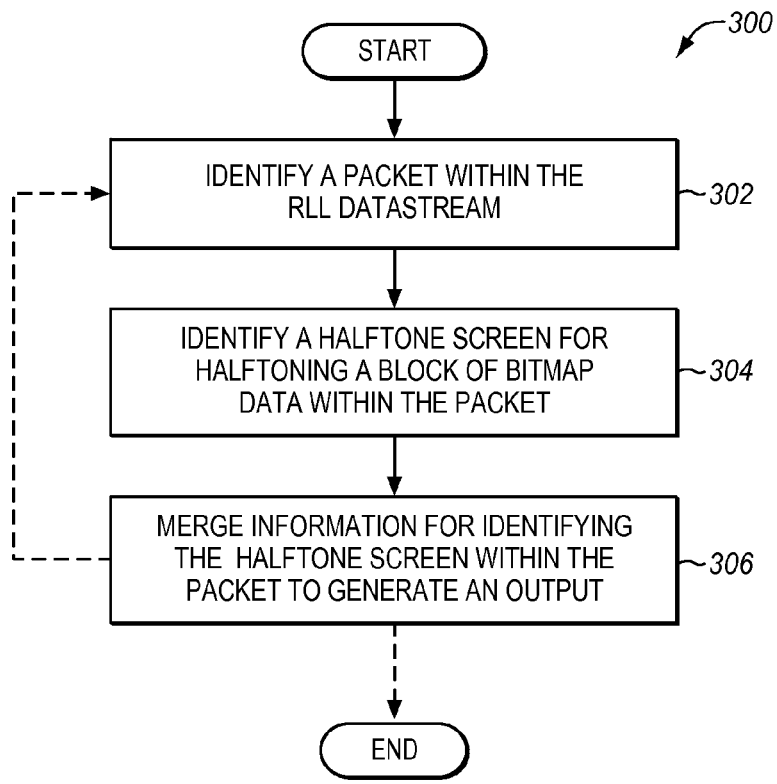
FIG. 3 is a flow chart illustrating a method of transcoding an RLL encoded datastream in an exemplary embodiment.

FIG. 3 is a flow chart illustrating a method 300 of transcoding an RLL encoded datastream in an exemplary embodiment. The steps of method 300 will be described with reference to system 100 of FIG. 1, although one skilled in the art will recognize that method 300 may be performed by other systems not shown. In addition, the steps of the flow charts provided herein are not all inclusive and other steps, not shown, may be included. Further, the steps may be performed in an alternative order.

In step 302, identification system 104 of transcoding system 102 identifies packet 211 within datastream 108, where packet 211 comprises header 201 and data block 206 of bitmap data defined by header 201, and where datastream 108 comprises continuous tone data.

In step 304, identification system 104 identifies halftone screen 112 for halftoning data block 206 within packet 211 identified in step 402. In step 306, insertion system 106 merges information for identifying halftone screen 112 within packet 212 identified in step 302 to generate output 110. Output 110 will be discussed in more detail with regard to FIG. 4.

Figure 4:
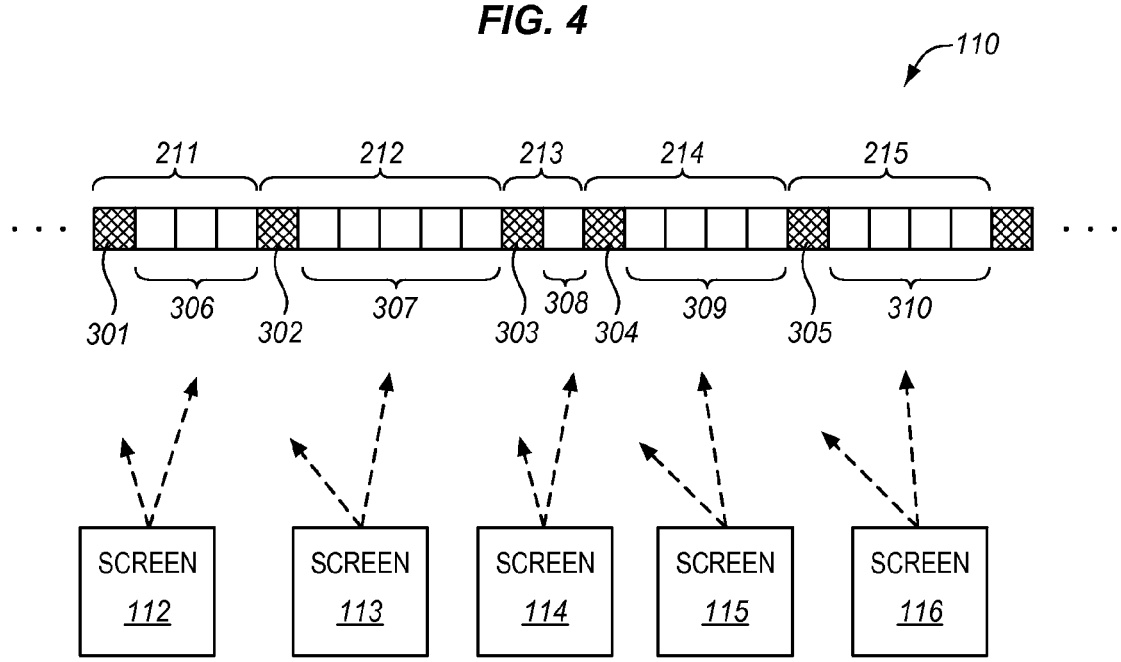
FIG. 4 illustrates a transcoded output for an RLL encoded datastream in an exemplary embodiment.

FIG. 4 illustrates transcoded output 110 generated by transcoding system 102 in an exemplary embodiment. Although datastream 110 illustrates a specific configuration of headers, data blocks, and associated halftone screens, one skilled in the art will recognize that datastream 110 may comprise various combinations of headers, data blocks, and associated halftone screens. Thus, datastream 110 is not limited to the specific configuration illustrated in FIG. 4.

In FIG. 4, output 110 includes headers 301-305 and data blocks 306-310 within packets 211-215, each of which may include one or more bits or bytes of transcoded data, such as bitmap data, and information for identifying the halftone screen for the bitmap data. For example, information for identifying halftone screen 112 may be merged in step 306 within header 301. In like manner, information for identifying halftone screen 113 may be merged in step 306 within header 302, information for identifying halftone screen 114 may be merged in step 306 within header 303, information for identifying halftone screen 115 may be merged in step 306 within header 304, and information for identifying halftone screen 116 may be merged in step 306 within header 305.

In other embodiments, information for identifying halftone screens may be merged within corresponding data blocks 306-310. For example, information for identifying halftone screen 112 may be merged in step 306 within data block 306. In like manner, information for identifying halftone screen 113 may be merged in step 306 within data block 307, information for identifying halftone screen 114 may be merged in step 306 within data block 308, information for identifying halftone screen 115 may be merged in step 306 within data block 309, and information for identifying halftone screen 116 may be merged in step 306 within data block 310.

By merging information identifying halftone screens for halftoning blocks of bitmap data within datastream 108, transcoding system 102 provides for a reduction in the bandwidth utilization and/or data storage requirements by including the information within output 110. In addition, because datastream 108 is not decoded prior to merging the information to generate output 310, fewer computational resources are utilized. After generating output 110, additional packets and halftone screens may be identified and information for identifying the halftone screens may be merged within headers and/or data blocks to generate output 110. As datastream 108 is processed in this manner, steps 302-306 may be repeated as illustrated by the dashed line in FIG. 3.

For example, step 302 may comprise sequentially identifying packets 212-215 within datastream 108. Step 304 may comprise identifying halftone screens 113-116 for halftoning corresponding data blocks 307-310. Step 306 may comprise merging the information for identifying halftone screens 113-116 within packets 212-215 to generate output 110.

Figure 5:
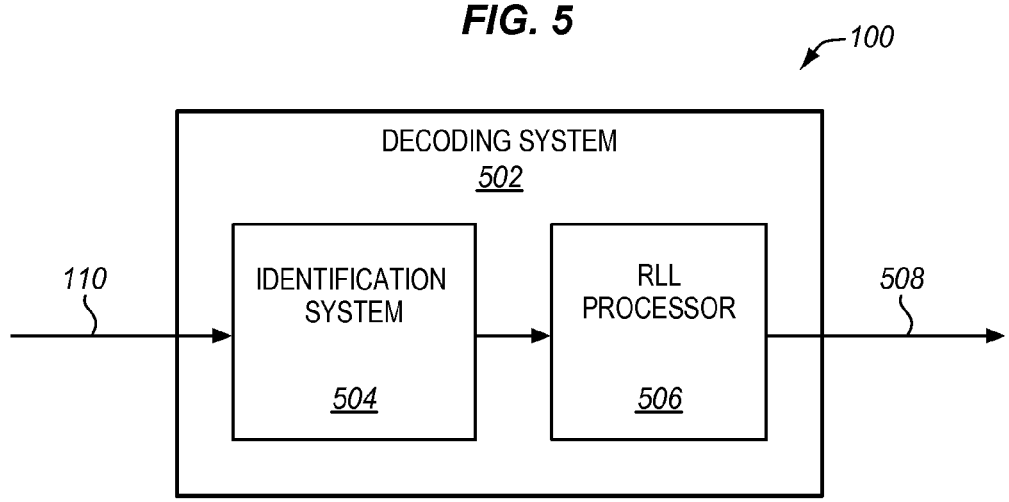
FIG. 5 illustrates an optional decoding system within the system of FIG. 1 in an exemplary embodiment.

In some cases, output 110 may be subsequently decoded prior to screening the bitmap data within output 110. FIG. 5 illustrates an optional decoding system 502 of system 100 in an exemplary embodiment. Decoding system 502 may for example be included within a printing system for decoding transcoded RLL print datastreams to extract the information for identifying halftone screens and the blocks of bitmap data prior generating a halftone output.

Decoding system 502 includes an identification system 504 and an RLL processor 506. Identification system 504 comprises any device, component, or system operable to identify blocks of bitmap data from output 110, and to identify halftone screens 112-116 associated with the blocks of bitmap data from output 110. RLL processor 506 comprises any device, component, or system operable to decode blocks of bitmap data based on an RLL encoding defined by headers corresponding to the bitmap data, and to provide the decoded blocks of bitmap data and the information for identifying halftone screens 112-116 to a halftoning system to generate a halftone output. The operation of decoding system 502 will be discussed with regards to method 600 of FIG. 6.

Figure 6:
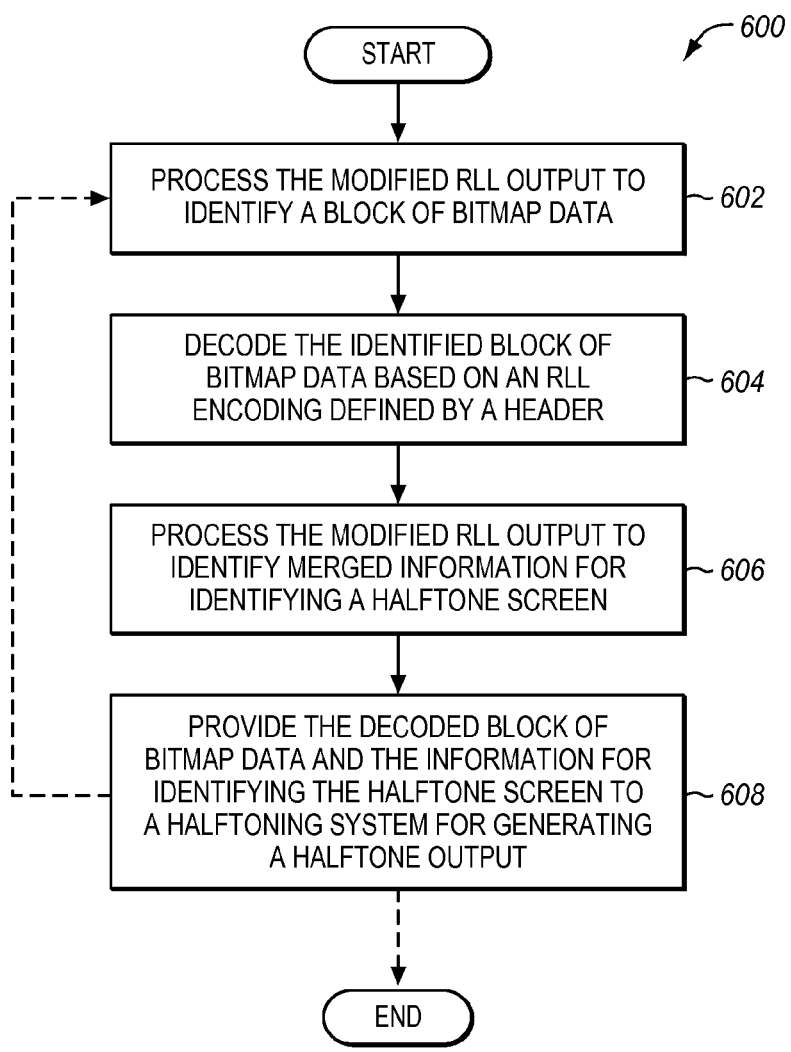
FIG. 6 is a flow chart illustrating a method of decoding a transcoded RLL encoded datastream in an exemplary embodiment.

FIG. 6 is a flow chart illustrating a method 600 of decoding a transcoded RLL encoded datastream in an exemplary embodiment. The steps of method 600 will be described with reference to system 100 of FIG. 5, although one skilled in the art will recognize that method 600 may be performed by other systems not shown.

In step 602, identification system 504 processes output 110 to identify data block 306 of FIG. 4. In step 604, RLL processor 506 decodes data block 306 based on an RLL encoding defined by header 301. In step 606, identification system 504 processes output 110 to identify the information for identifying halftone screen 112. In step 608, RLL processor 506 provides decoded data block 306 and the information for identifying halftone screen 112 to a halftoning system for generating a halftone output as output 508.

After generating output 508, additional blocks of bitmap data may be identified and decoded, and the information for identifying the halftone screens may be identified to generate output 110. As datastream 110 is processed in this manner, steps 602-606 may be repeated as illustrated by the dashed line in FIG. 6. For example, step 602 may comprise sequentially identifying data blocks 307-310. Step 604 may comprise decoding data blocks 307-310. Step 604 may comprise identifying the information for identifying halftone screens 113-116. Step 608 may comprise providing decoded data blocks 307-310 and the information for identifying halftone screens 113-116 to a halftoning system to generate output 508.

In some cases, print data is encoded in an RLL format for transmission between processes within a print controller in order to reduce the amount of bandwidth utilized and/or the memory storage usage of the print data. For example, a host may generate a Page Description Language (PDL) print datastream for a printer. After the print controller receives the PDL print datastream, the print controller may generate an RLL encoded datastream, such as datastream 108. The print controller may then utilize transcoding system 102 to merge the information for identifying halftone screens within output 110. In an optional embodiment, the print controller may utilize decoding system 502 to decode output 110 prior to screening the bitmap data within output 110. After decoding and screening the bitmap data, the printer controller provides the bitmap data to a print engine for printing.

Figure 7:
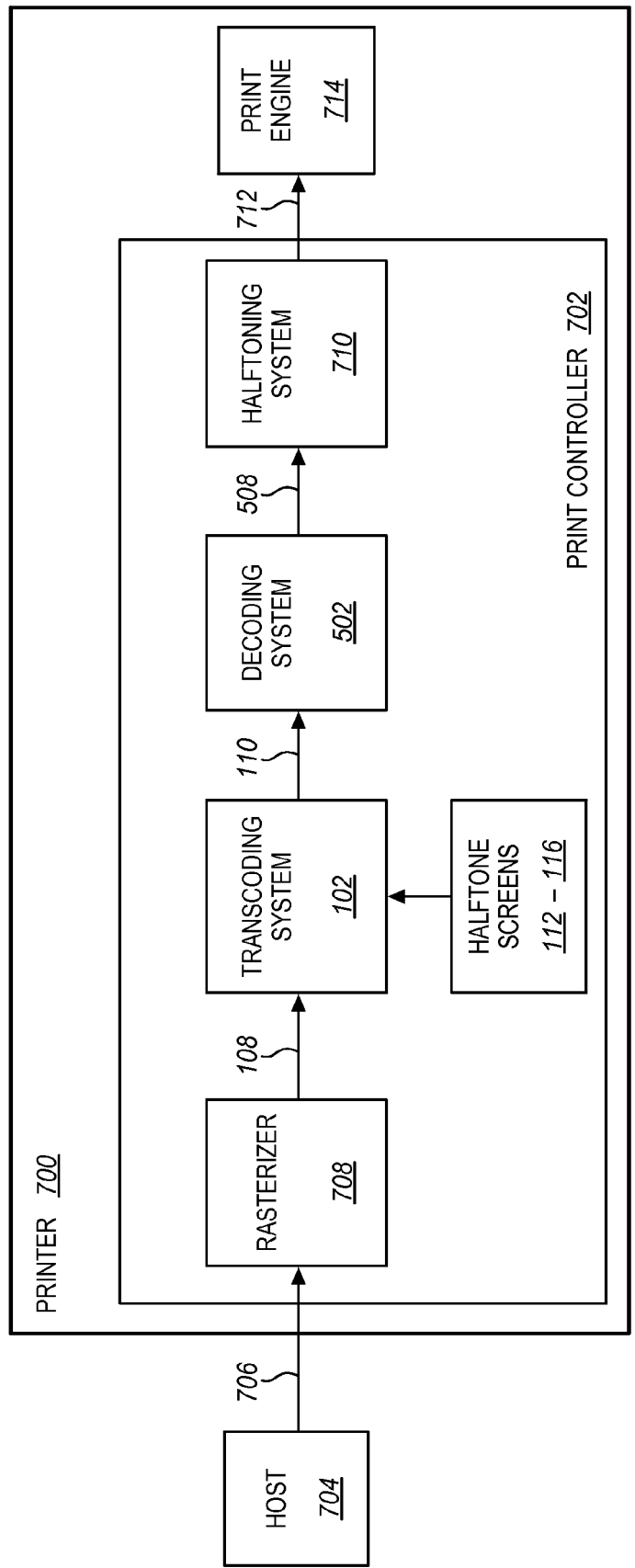
FIG. 7 illustrates a printer in an exemplary embodiment.

FIG. 7 illustrates a printer 700 in an exemplary embodiment. Printer 700 comprises any system used to provide marks on a media, such as a continuous forms printer or a cut sheet page printer. Printer 700 may be owned by a company or other entity, and may be shared by multiple users. In this embodiment, Printer 700 includes a print controller 702. Print controller 702 comprises any device, component, or system operable to interface a host 704 with one or more print engines 714 and to control the printing of print jobs received from host 704 for print engines 714. Print controller 702 may include one or more rasterizers 708 operable to receive print data 706 from host 704 and to generate RLL encoded datastream 108. Print data 706 may include various PDL data, such as PostScript data, PDF data, IPDS data, AFP data, MODCA, or other types of PDL data. Print controller 702 may also include one or more transcoding systems 102 for transcoding datastreams and/or one or more decoding systems 502 for decoding the transcoded datastreams.

Output 508 generated by decoding system 502 comprises a decoded representation of previously transcoded print data, such as bitmap data and information for identifying halftone screens 112-116 for the bitmap data. A halftoning system 710 receives output 508 from decoding system 502, and performs a halftoning process on the decoded bitmap data based on a corresponding halftone screen to generate a halftoned output 712 for one or more print engines 714. Halftoning system 710 may for example perform a halftone process on various bitmap objects to be printed by print engine 714 such that each bitmap object is halftoned based on a different halftone screen. Thus, in some embodiments, text bitmap objects may be halftoned by halftoning system 710 based on one halftone screen and graphical objects may be halftoned by halftone system 710 based on a second halftone screen. Print engine 714 of printer 700 comprises any system operable to provide an imaging process to mark a printable medium, such as paper. In printer 700, print engine 714 receives output 712 from halftoning system 710 to generate a printed output of print data 706. Printer 700 may include other components or systems not shown for the sake of brevity.

In some cases, more than one halftone screen may be associated with a block of bitmap data. For example, a block of bitmap data may span a number of bitmap objects, such as text objects and graphic objects. As it may be desirable to utilize different halftone screens for screening different objects, blocks of data in datastream 108 may first be parsed into a plurality of data blocks, where each data block associated with a different halftone screen.

Figure 8:
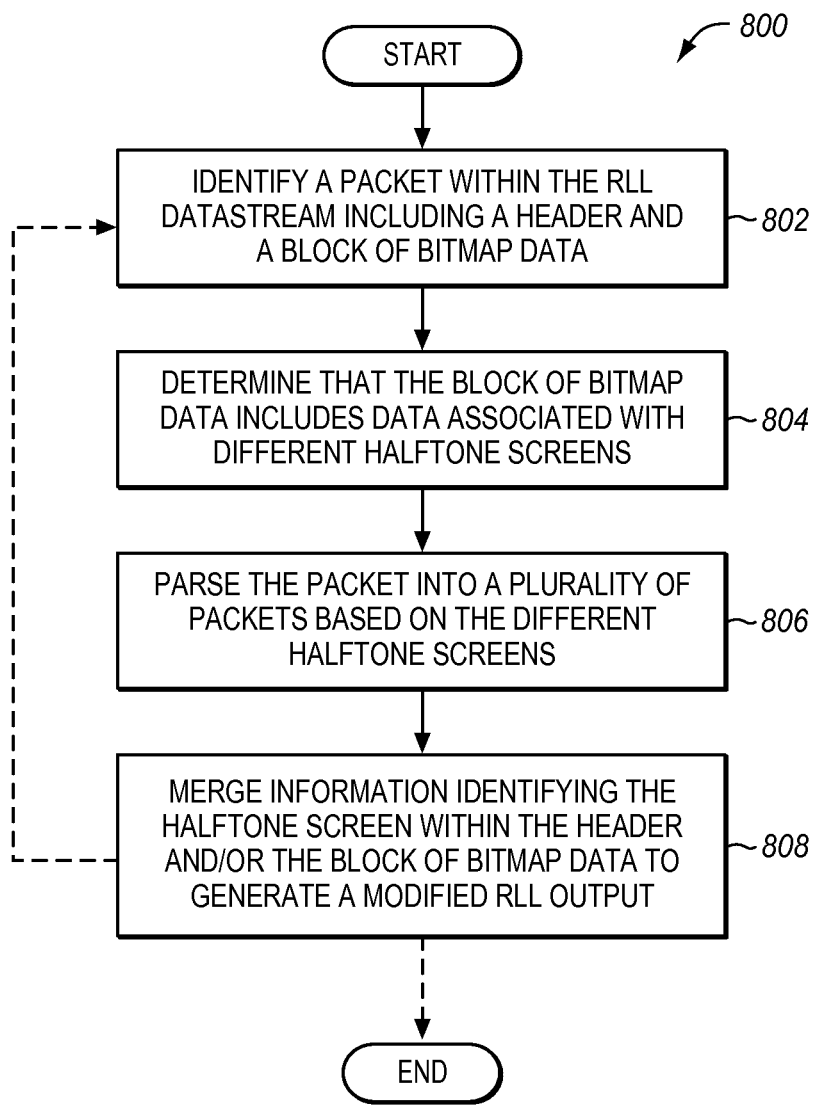
FIG. 8 is a flow chart illustrating a method of parsing packets in an RLL encoded datastream associated with multiple halftone screens in an exemplary embodiment.

FIG. 8 is a flow chart illustrating a method 800 of parsing packets in an RLL encoded datastream associated with multiple halftone screens in an exemplary embodiment. The steps of method 800 will be described with respect to printer 700 of FIG. 7, although one skilled in the art will recognize that method 700 may be performed by other systems not shown.

In step 802, transcoding system 102 within print controller 702 identifies packet 211 (see FIG. 2) within datastream 108, where packet 211 includes header 201 and data block 206. For example, rasterizer 708 within print controller 702 may receive print data 706 from host 704, and rasterize print data 706 to generate datastream 108. If datastream 108 is a PackBits format datastream, then transcoding system 102 may first inspect header 201 to determine if header 201 defines literal or repeat data. In a PackBits datastream, headers may comprise literal headers, repeat headers, or indicate a skip header.

The following table illustrates how headers are encoded in PackBits:

TABLE 1

| Header | Data following the header |
|---|---|
| 0 to 127 | (1 + n) literal bytes of data |
| −1 to −127 | One byte of data repeated (1-n) times in the decompressed output |
| −128 | No operation (skip and treat the next byte as a header byte) |

When the signed header ranges from 0 to 127, the header defines the bytes subsequent to the header in the datastream as literal data. The value of the header also defines the number of bytes of literal data as 1+n, where n is the signed value of the header. For example, if header 201 has a value of 2, then header 201 defines that the next 3 bytes in datastream 108 are literal data bytes. This is indicated in FIG. 2 by data block 206, which spans 3 blocks of data. Using the location of header 201 within datastream 108 and the length of the data block 206 determined by analyzing header 202, Transcoding system 102 is therefore able to identify packet 211 within datastream 108.

Figure 9:
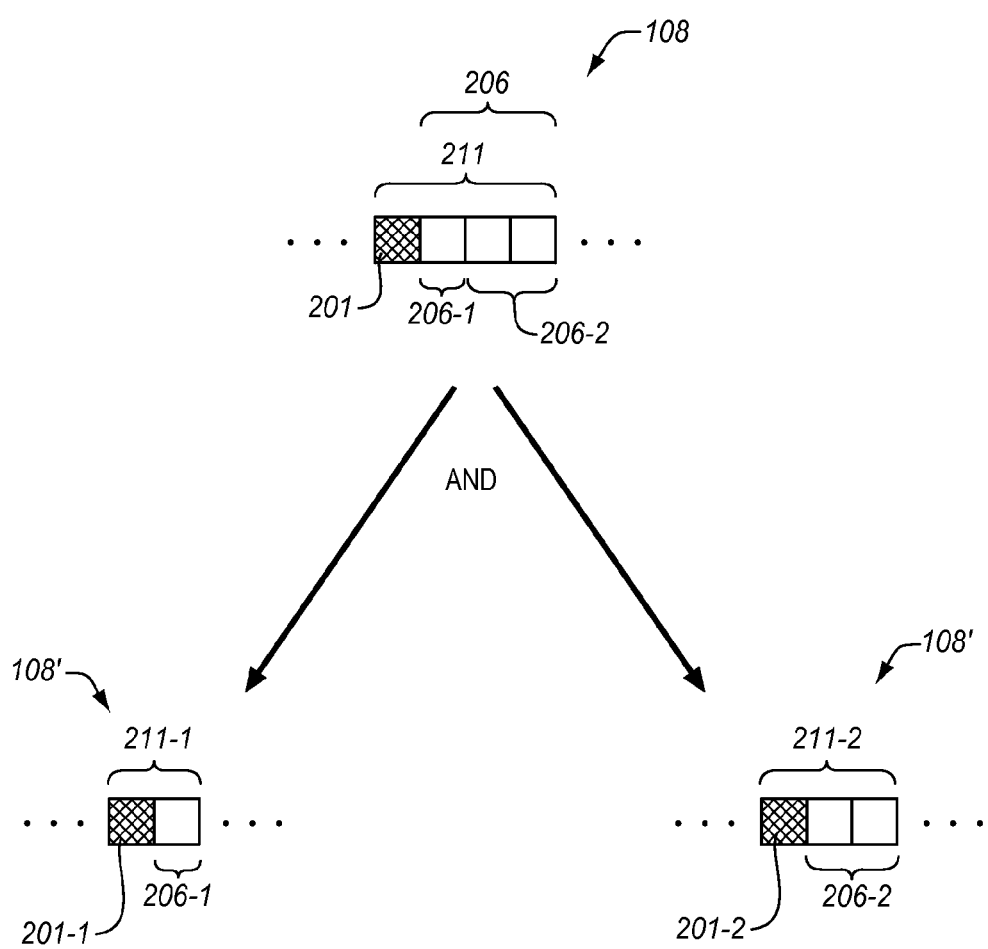
FIG. 9 illustrates parsing an RLL encoded datastream in an exemplary embodiment.

In step 804, Transcoding system 102 determines that data block 206 includes data associated with different halftone screens 112-1 and 112-2. FIG. 9 is an illustration of a portion of datastream 108 in an exemplary embodiment including data blocks 206-1 and 206-2 within packet 211, each of the data blocks 206-1 and 206-2 associated with corresponding halftone screens 112-1 and 112-2. FIG. 9 illustrates just one configuration of how different portions of data block 206 may be associated with different halftone screens 112-1 and 112-2, and one skilled in the art will recognize that other configurations may exist. FIG. 9 illustrates data block 206 comprising a data block 206-1 associated with halftone screen 112-1 and a data block 206-2 associated with halftone screen 112-2. For example, data block 206-1 may include a type of data different from data block 206-2, and therefore may be more accurately printed by print engine 714 when halftoned using halftone screen 112-1 instead of halftone screen 112-2. Thus, it may be desirable to associate halftone screen 112-1 with data block 206-1 and halftone screen 112-2 with data block 206-2. For example, it may be desirable to associate different halftone screens for color image data blocks, black and white image data blocks, text data blocks, and line graphic data blocks.

In step 806, Transcoding system 102 parses packet 211 into a plurality of packets 211-1 and 211-2 based on different halftone screens 112-1 and 112-2. In continuing with the example, FIG. 9 illustrates parsing packet 211 into a packet 211-1 and packet 211-2. Packet 211-1 includes header 201-1 and data block 206-1 associated with halftone screen 112-1. Packet 211-2 includes header 201-2 and data block 206-2 associated with halftone screen 112-2. In FIG. 9, packet 211 includes 3 bytes of literal data as defined by header 201. In the PackBits format, this would be the result of header 201 having the value of 2, as a literal header defines n+1 bytes of subsequent data (see table 1). Because splitting packet 211 into packets 211-1 and 211-2 results in a change in the number of literal bytes of data within each of the newly created packets, the value of the new literal headers 201-1 and 201-2 are recalculated by transcoding system 102. In the example, packet 211-1 includes 1 byte of literal data, as shown by data block 206-1. Thus, header 201-1 is generated with a value of 0 by transcoding system 102, as a literal header defines n+1 bytes of subsequent data (see table 1). As data block 206-2 in the example includes 2 bytes of literal data, header 201-2 is generated with a value of 1 by transcoding system 102.

Figure 10:
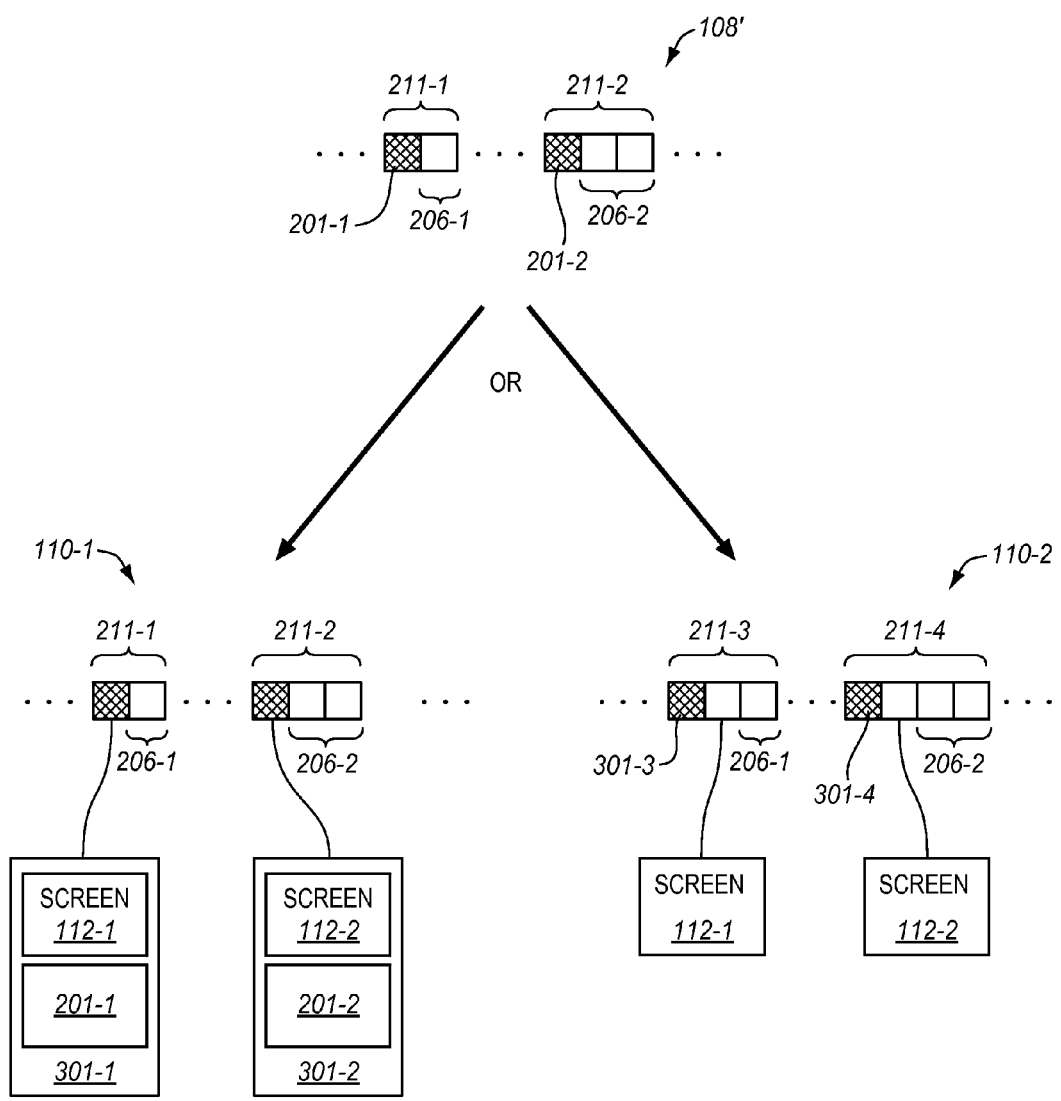
FIG. 10 illustrates two optional configurations of a transcoded output for an RLL encoded datastream in an exemplary embodiment.

In step 808, Transcoding system 102 merges information for identifying halftone screens 112-1 and 112-2 within headers 201-1 and 201-2 and/or the data blocks 206-1 and 206-2 to generate output 110. FIG. 10 is an illustration of two optional configurations resulting from merging information for identifying the halftone screens within packets 211-1 and 211-2 to generate output 110 an exemplary embodiment. FIG. 10 illustrates just two configurations of how information identifying halftone screens may be merged into packets 211-1 and 212-1, and one skilled in the art will recognize that other configurations may exist. In FIG. 10, output 110-1 illustrates the result of merging information for identifying halftone screens 112-1 and 112-2 within headers 301-1 and 301-2, respectively. In output 110-1, header 301-1 includes information for identifying halftone screen 112-1 and header 201-1. Thus, header 301-1 includes information for identifying halftone screen 112-1 for data block 206-1 and information for header 201-1 defining the type of data (i.e., literal or repeat) and the number of data bytes for data block 206-1. In like manner, header 301-2 includes information for identifying halftone screen 112-2 for data block 206-2 and information for header 201-2 defining the type of data and the number of data bytes for block 206-2. In some cases, typical PackBits headers may be modified to encode the type of screen information for the data blocks. For example, if 2 bits of data were utilized to encode information for identifying halftone screens within a modified PackBits header, then headers 301-1 and 301-2 may encode up to 4 halftone screens associated with up to 32 counts of literal data. Thus, header 301-1 may encode up to 4 halftone screens for data block 206-1, and data block 206-1 may include up to 32 bytes of literal data. In like manner, header 301-2 may encode up to 4 halftone screens for data block 206-2, and data block 206-2 may include up to 32 bytes of literal data. In other embodiments, fewer or more bits of data may be utilized to encode information for identifying halftone screens within headers 301-1 and 301-2, thus resulting in fewer or more possible halftone screens being identified. Table 2 below illustrates one possible embodiment detailing the result of utilizing 2 bits of data to encode information for identifying halftone screens within a modified PackBits header.

TABLE 2

| hex (n) | signed decimal (n) | original literal count (n + 1) | halftone screen tag | new literal count |
|---|---|---|---|---|
| 80 | 128 | IGNORE | NA | NA |
| 7f | 127 | 128 | 3 | 32 |
| 7e | 126 | 127 | 2 | 32 |
| 7d | 125 | 126 | 1 | 32 |
| 7c | 124 | 125 | 0 | 32 |
| 7b | 123 | 124 | 3 | 31 |
| 7a | 122 | 123 | 2 | 31 |
| 79 | 121 | 122 | 1 | 31 |
| 78 | 120 | 121 | 0 | 31 |
| 77 | 119 | 120 | 3 | 30 |
| 76 | 118 | 119 | 2 | 30 |
| 75 | 117 | 118 | 1 | 30 |
| 74 | 116 | 117 | 0 | 30 |
| 73 | 115 | 116 | 3 | 29 |
| 72 | 114 | 115 | 2 | 29 |
| 71 | 113 | 114 | 1 | 29 |
| 70 | 112 | 113 | 0 | 29 |
| . | . | . | . | . |
| . | . | . | . | . |
| . | . | . | . | . |
| f | 15 | 16 | 3 | 4 |
| e | 14 | 15 | 2 | 4 |
| d | 13 | 14 | 1 | 4 |
| c | 12 | 13 | 0 | 4 |
| b | 11 | 12 | 3 | 3 |
| a | 10 | 11 | 2 | 3 |
| 9 | 9 | 10 | 1 | 3 |
| 8 | 8 | 9 | 0 | 3 |
| 7 | 7 | 8 | 3 | 2 |
| 6 | 6 | 7 | 2 | 2 |
| 5 | 5 | 6 | 1 | 2 |
| 4 | 4 | 5 | 0 | 2 |
| 3 | 3 | 4 | 3 | 1 |
| 2 | 2 | 3 | 2 | 1 |
| 1 | 1 | 2 | 1 | 1 |
| 0 | 0 | 1 | 0 | 1 |

Although output 110-1 illustrates one embodiment for encoding information for identifying halftone screens within a literal PackBits header, the information may also be merged within a repeat PackBits header. As illustrated in Table 1, PackBits encoded data may also include repeat data. In PackBits, repeat data is represented by a header value between −1 and −127, which defines the byte subsequent to the header as repeat data (see header 203 and data block 208 in FIG. 2). When a byte subsequent to the header is encoded in the PackBits format, the value of the repeat header also defines the number of repeat bytes of data as 1−n in the decoded output. For example, if a repeat header has a value of −5, then the repeat header defines that the next byte of data (e.g., data block 208 of FIG. 2) is repeated 6 times in the decoded output (6=1−(−5)). When 2 bits of header information are utilized to encode information identifying up to 4 halftone screens within a repeat header, then Table 3 below illustrates one possible embodiment of this implementation.

TABLE 3

| hex (n) | signed decimal (n) | original literal count (1−n) | halftone screen tag | new literal count |
|---|---|---|---|---|
| ff | −1 | 2 | 3 | 4 |
| fe | −2 | 3 | 2 | 4 |
| fd | −3 | 4 | 1 | 4 |
| fc | −4 | 5 | 0 | 4 |
| fb | −5 | 6 | 3 | 8 |
| fa | −6 | 7 | 2 | 8 |
| f9 | −7 | 8 | 1 | 8 |
| f8 | −8 | 9 | 0 | 8 |
| f7 | −9 | 10 | 3 | 12 |
| f6 | −10 | 11 | 2 | 12 |
| f5 | −11 | 12 | 1 | 12 |
| f4 | −12 | 13 | 0 | 12 |
| f3 | −13 | 14 | 3 | 16 |
| f2 | −14 | 15 | 2 | 16 |
| f1 | −15 | 16 | 1 | 16 |
| f0 | −16 | 17 | 0 | 16 |
| . | . | . | . | . |
| . | . | . | . | . |
| 8f | −113 | 114 | 3 | 116 |
| 8e | −114 | 115 | 2 | 116 |
| 8d | −115 | 116 | 1 | 116 |
| 8c | −116 | 117 | 0 | 116 |
| 8b | −117 | 118 | 3 | 120 |
| 8a | −118 | 119 | 2 | 120 |
| 89 | −119 | 120 | 1 | 120 |
| 88 | −120 | 121 | 0 | 120 |
| 87 | −121 | 122 | 3 | 124 |
| 86 | −122 | 123 | 2 | 124 |
| 85 | −123 | 124 | 1 | 124 |
| 84 | −124 | 125 | 0 | 124 |
| 83 | −125 | 126 | 3 | 128 |
| 82 | −126 | 127 | 2 | 128 |
| 81 | −127 | 128 | 1 | 128 |

FIG. 10 also illustrates an alternate configuration for output 110 where the information is merged within packets 211-3 and 211-4 in output 110-2. In output 110-2, information for identifying halftone screens 112-1 and 112-2 are added as separate data blocks within packets 211-2 and 211-3. For example, in packet 211-3, information for identifying halftone screen 112-1 is inserted between header 301-3 and data block 206-1. In packet 211-4, information for identifying screen 112-2 is inserted between header 301-4 and data block 206-2. Because information for identifying halftone screens 112-1 and 112-2 are included as additional data blocks within corresponding packets 211-3 and 211-4, additional bits of data may be available to encode the information. For example, if each data block in output 110-2 comprises 8 bits of data, the additional data blocks may encode information identifying up to 256 halftone screens for data blocks 206-1 and 206-2. One skilled in the art will recognize that although information for identifying screen 112-1 has been illustrated as residing between header 301-3 and data block 206-1 within packet 211-3, output 110-2 is not limited to this specific configuration.

In an optional embodiment, 2 bits of screen information may be used within an 8 bit "screen tag" to encode information identifying up to 4 halftone screens, one for each byte of data within a block of bitmap data. When implementing this embodiment, each packet of data would comprise one header, one screen tag byte, and 4 bytes of bitmap data. This type of per-byte halftone screen association allows different halftone screens to be utilized for each byte of bitmap data when performing a halftone process.

After generating output 110 in step 808, additional packets may be identified in datastream 108 and merged with corresponding information for identifying halftone screens to generate output 110. As datastream 108 is processed in this manner, steps 802-808 may be repeated as illustrated by the dashed line in FIG. 8.

After transcoder 102 transcodes datastream 108 to generate output 110, output 110 may be routed to various print processes operating within print controller 702. For example, output 110 may be persistently stored within printer 700, such as in a print spool. Prior to printing, the transcoded data is decoded, halftoned, and presented to print engine 714 for output. Decoding output 508 by print controller 702 will be discussed with regards to method 600 of FIG. 6.

In step 602 of FIG. 6, decoding system 502 identifies data block 306 from output 110. Data block 306 may comprise bitmap data encoded in an RLL format for subsequent printing by print engine 714. For example, decoding system 502 may first identify packet 211 from output 110 by locating header 301 and determining an offset within output 110 based on the number of data blocks 306 defined by header 301 in a manner similar to locating header 201 of datastream 108. In contrast to datastream 108 however, output 110 may include one or more headers 301-310 and/or one or more data blocks 306-310 modified to include information for identifying halftone screens. In cases where one or more headers 301-305 are modified in this manner, variations on determining offsets within output 110 based on a modified header may apply. For example, referring to tables 2-3, headers 301-305 within output 110 may encode a different number of literal or repeat data bytes than the original PackBits specification. In these cases, the type of header (e.g., PackBits or modified PackBits) may first be determined prior to performing a decoding process.

In cases where one or more data blocks 306-310 are modified, variations on determining the location of bitmap data within packets 211-215 may depend upon the type of modification performed as compared to the original PackBits specification. For example, referring to FIG. 10, packet 211-3 in output 110-2 includes both information for identifying halftone screen 112-1 and data block 206-1 corresponding to an encoded data location within packet 211-3 in a PackBits encoded format. Thus, the type of data encoding for the data portion of packets 211-215 (e.g., PackBits or modified PackBits) may first be determined prior to performing a decoding process.

In response to identifying packet 211 (see FIG. 3), decoding system 502 may identify header 301 as a literal or repeat header and then determine the number of bytes of data defined by header 301 corresponding to data block 306.

In step 604, decoding system 502 decodes data block 306 based on the RLL encoding defined by header 301. In the example, header 301 defines literal data. Thus, decoding system 502, when decoding data block 306, parses data block 306 from output 110 to generate a decoded output for data block 306. When a header defines repeat data, decoding the repeat data comprises generating the same byte of data n number of times, depending on the number of repeat data bytes defined in a corresponding header.

In step 606, decoding system 502 identifies information for identifying halftone screen 112 associated with data block 306. As discussed, information for identifying halftone screen 112 may be encoded within header 301 and/or within data block 306.

In step 608, decoding system 502 generates an output 508 to provide the decoded output for data block 306 and halftone screen 112 to halftoning system 710. In an optional embodiment, decoding system 502 may provide information for identifying halftone screen 112 to the halftoning system 710, thus allowing halftoning system 710 to utilize a lookup table to locate halftone screen 112 prior to screening data block 306.

As output 110 may include a plurality of data blocks 306-310 for subsequent decoding, steps 602-608 may be repeated as necessary by decoding system 502 to generate output 508.

In response to receiving output 508 from decoding system 502, halftoning system generates a halftone output 712 for print engine 714 by processing data blocks 306-310 based on associated halftone screens 112-116. Print engine 714 may then process halftone output 712 to generate a printed output.

Figure 11:
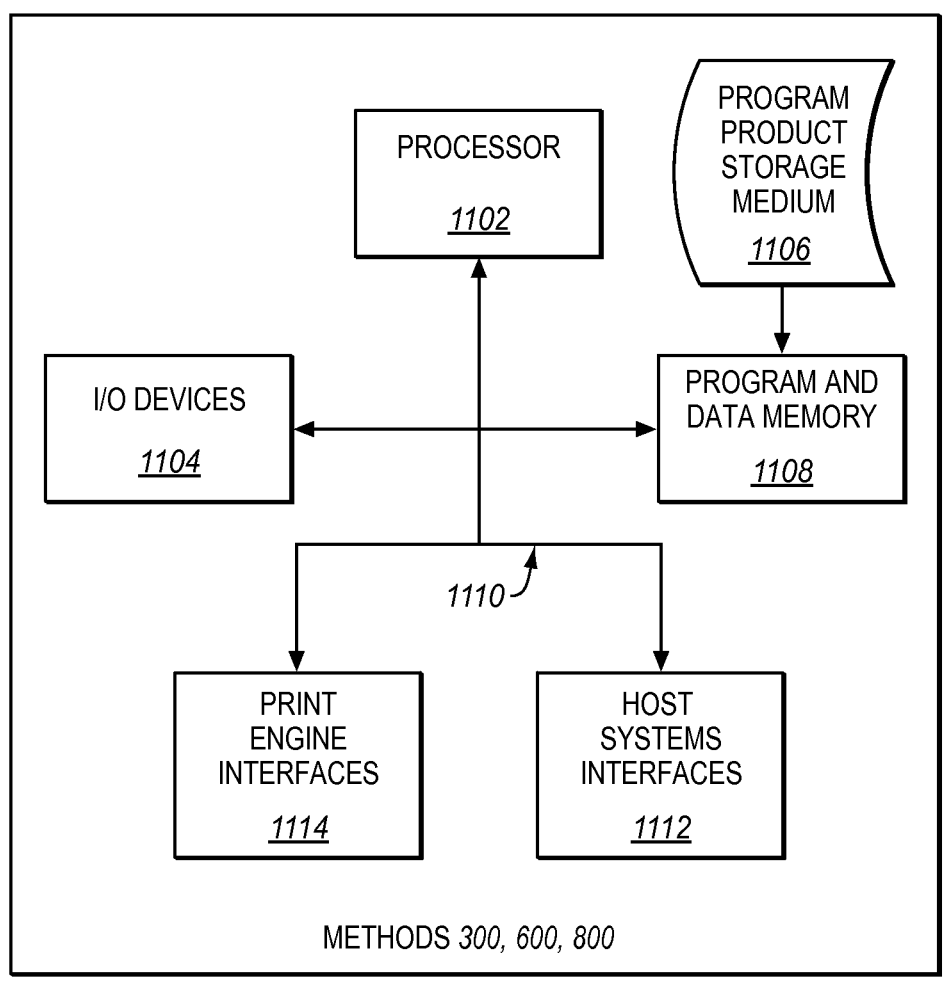
FIG. 11 illustrates a computing device in which a computer readable medium may provide the methods disclosed herein in an exemplary embodiment.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 11 illustrates a computing device in which a computer readable medium 1106 may provide instructions for performing methods 300, 600, and/or 800 disclosed herein in an exemplary embodiment.

Furthermore, the invention can take the form of a computer program product accessible from a computer-usable or computer-readable medium 1106 providing program code for use by or in connection with a computer or any instruction execution system. For the purposes of this description, a computer-usable or computer readable medium 1106 can be any apparatus that can contain, store, communicate, propagate, or transport the program for use by or in connection with the instruction execution system, apparatus, or device.

The medium 1106 can be an electronic, magnetic, optical, electromagnetic, infrared, or semiconductor system (or apparatus or device) or a propagation medium. Examples of a computer-readable medium 1106 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 1102 coupled directly or indirectly to memory elements 1108 through a system bus 1110. The memory elements 1108 can include local memory employed during actual execution of the program code, bulk storage, and cache memories which provide temporary storage of at least some program code in order to reduce the number of times code is retrieved from bulk storage during execution.

Input/output or I/O devices 1104 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 1112, or remote printers or storage devices through intervening private or public networks, such as through print engine interfaces 1114. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

I claim:

1. A method comprising:
identifying a first packet within a Run Length Limited (RLL) encoded datastream, wherein the first packet comprises a first header and a first block of at least one byte of continuous tone bitmap data, and wherein the first header is a byte that defines a type of RLL encoding for the first block of bitmap data and a number of bytes in the first block subsequent to the first header;
identifying a first halftone screen for halftoning the first block of bitmap data; and
merging information for identifying the first halftone screen within the first header to generate a modified RLL output by:
reducing a number of bits used in the first header to define the number of bytes in the first block to form an unused number of bits in the first header; and
inserting the information for identifying the first halftone screen in the unused number of bits.

2. The method of claim 1 further comprising:
identifying a second packet within the RLL datastream, wherein the second packet comprises a second header subsequent to the first packet and a second block of at least one byte of continuous tone bitmap data, and wherein the second header is a byte that defines a type of RLL encoding for the second block of bitmap data and a number of bytes in the second block subsequent to the second header;
identifying a second halftone screen for halftoning the second block of bitmap data, wherein the first halftone screen and the second halftone screen are different halftone screens; and
merging information for identifying the second halftone screen within the second header to generate the modified RLL output.

3. The method of claim 1 wherein merging the information further comprises:
generating at least one block of screen information based on the first halftone screen; and
inserting the at least one block of screen information within the first header.

4. The method of claim 1 further comprising:
processing the modified RLL output to identify the first block of bitmap data;
decoding the first block of bitmap data based on an RLL encoding defined by the first header;
processing the modified RLL output to identify the merged information for identifying the first halftone screen; and
providing the decoded first block of bitmap data and the information for identifying the first halftone screen to a halftoning system for generating a halftone output.

5. The method of claim 1 further comprising:
determining that the first block of bitmap data within the first packet includes a first portion of data associated with the first halftone screen and a second portion of data associated with a different halftone screen than the first halftone screen; and
parsing the first packet into a first sub-packet including the first portion of data associated with the first halftone screen and a second sub-packet including the second portion of data associated with the different halftone screen.

6. A system comprising:
a transcoding system including:
an identification system operable to identify a first packet within a Run Length Limited (RLL) encoded datastream, wherein the first packet comprises a first header and a first block of at least one byte of continuous tone bitmap data, wherein the first header is a byte that defines a type of RLL encoding for the first block of bitmap data and a number of bytes in the first block subsequent to the first header, and wherein the identification system is further operable to identify a first halftone screen for halftoning the first block of bitmap data; and
an insertion system operable to merge information for identifying the first halftone screen within the first header to generate a modified RLL output by:
reducing a number of bits used in the first header to define the number of bytes in the first block to form an unused number of bits in the first header, and inserting the information for identifying the first halftone screen in the unused number of bits.

7. The system of claim 6 wherein:
the identification system is further operable to identify a second packet within the RLL datastream, wherein the second packet comprises a second header subsequent to the first packet and a second block of at least one byte of continuous tone bitmap data, wherein the second header is a byte that defines a type of RLL encoding for the second block of bitmap data and a number of bytes in the second block subsequent to the second header;
the identification system is further operable to identify a second halftone screen for halftoning the second block of bitmap data, wherein the first halftone screen and the second halftone screen are different halftone screens; and
the insertion system is further operable to merge information for identifying the second halftone screen within the second header to generate the modified RLL output.

8. The system of claim 6 wherein the insertion system is further operable to generate at least one block of screen information based on the first halftone screen, and to insert the at least one block of screen information within the first header.

9. The system of claim 6 further comprising:
a decoding system including:
an identification system operable to identify the first block of bitmap data from the modified RLL output, and to identify the first halftone screen from the modified RLL output; and
an RLL processor operable to decode the first block of bitmap data based on an RLL encoding defined by the first header, and to provide the decoded first block of bitmap data and the information for identifying the first halftone screen to a halftoning system operable to generate a halftone output.

10. The system of claim 6 wherein:
the identification system is further operable to determine that the first block of bitmap data within the first packet includes a first portion of data associated with the first halftone screen and a second portion of data associated with a different halftone screen than the first halftone screen; and
the identification system is further operable to parse the first packet into a first sub-packet including the first portion of data associated with the first halftone screen and a second sub-packet including the second portion of data associated with the different halftone screen.

11. A printer comprising:
a print controller operable to identify a first packet within a Run Length Limited (RLL) encoded datastream, wherein the first packet comprises a first header and a first block of at least one byte of continuous tone bitmap data, wherein the first header is a byte that defines a type of RLL encoding for the first block of bitmap data and a number of bytes in the first block subsequent to the first header, wherein the print controller is further operable to identify a first halftone screen for halftoning the first block of bitmap data, and to merge information for identifying the first halftone screen within the first header to generate a modified RLL output by:

reducing a number of bits used in the first header to define the number of bytes in the first block to form an unused number of bits in the first header, and inserting the information for identifying the first halftone screen in the unused number of bits.

12. The printer of claim 11 wherein:
the print controller is further operable to identify a second packet within the RLL datastream, wherein the second packet comprises a second header subsequent to the first packet and a second block of at least one byte of continuous tone bitmap data, and wherein the second header is a byte that defines a type of RLL encoding for the second block of bitmap data and a number of bytes in the second block subsequent to the second header; and the print controller is further operable to identify a second halftone screen for halftoning the second block of bitmap data, wherein the first halftone screen and the second halftone screen are different halftone screens, and to merge information for identifying the second halftone screen within the second header to generate the modified RLL output.

13. The printer of claim 11 wherein the print controller is further operable to generate at least one block of screen information based on the first halftone screen, and to insert the at least one block of screen information within the first header.

14. The printer of claim 11 wherein:
the print controller is further operable to identify the first block of bitmap data from the modified RLL output, and to identify the first halftone screen from the modified RLL output, and to provide the information for identifying the first halftone screen to a halftoning system operable to generate a halftone output; and the printer controller is further operable to decode the first block of bitmap data based on an RLL encoding defined by the first header, and to provide the decoded first block of bitmap data to the halftoning system.

15. The printer of claim 11 wherein:
the print controller is further operable to determine that the first block of bitmap data within the first packet includes a first portion of data associated with the first halftone screen and a second portion of data associated with a different halftone screen than the first halftone screen; and the print controller is further operable to parse the first packet into a first sub-packet including the first portion of data associated with the first halftone screen and a second sub-packet including the second portion of data associated with the different halftone screen.

* * * * *